United States Patent [19]
Mefferd

[11] Patent Number: 4,818,089
[45] Date of Patent: Apr. 4, 1989

[54] KINEMATIC RESONATOR SUPPORT

[75] Inventor: Wayne S. Mefferd, Los Altos Hills, Calif.

[73] Assignee: Coherent, Inc., Palo Alto, Calif.

[21] Appl. No.: 42,272

[22] Filed: Apr. 24, 1987

[51] Int. Cl.⁴ .............................. G02B 7/18; G02B 5/08
[52] U.S. Cl. ..................................... 350/634; 350/633; 372/107
[58] Field of Search ............... 350/633, 634, 632, 636, 350/321, 252; 372/107; 248/487

[56] References Cited
U.S. PATENT DOCUMENTS

| | | | |
|---|---|---|---|
| 3,407,018 | 10/1968 | Miller | 350/634 |
| 3,428,915 | 2/1969 | Leone et al. | 350/632 |
| 3,436,050 | 4/1969 | Tibbals | 350/633 |
| 3,700,313 | 10/1972 | Karr et al. | 350/633 |
| 4,023,891 | 5/1977 | Chadwick | 350/634 |
| 4,442,524 | 4/1984 | Reeder et al. | 372/107 |

FOREIGN PATENT DOCUMENTS 653593  3/1979  U.S.S.R. .................. 350/634

OTHER PUBLICATIONS

A. Frosch et al., "Positioning Device for Optical Components", *IBM Tech. Dis. Bull.*, vol. 18, No. 10, Mar. 1976, p. 3333.

*Primary Examiner*—Jon W. Henry
*Attorney, Agent, or Firm*—Limbach, Limbach & Sutton

[57] ABSTRACT

The subject invention relates to a laser system where the length stability of the resonant cavity is important. Three unique mounting assemblies are disclosed to improve the stability of the cavity. The first assembly relates to a kinematic support for mounting an Invar bar. The second assembly defines a once-piece gimbal pivot ring designed to mount laser mirrors. The final aspect of the invention includes a mounting assembly designed to automatically compensate for changes in length of an Invar support bar due to temperature variations which could alter the cavity length of the laser.

5 Claims, 3 Drawing Sheets

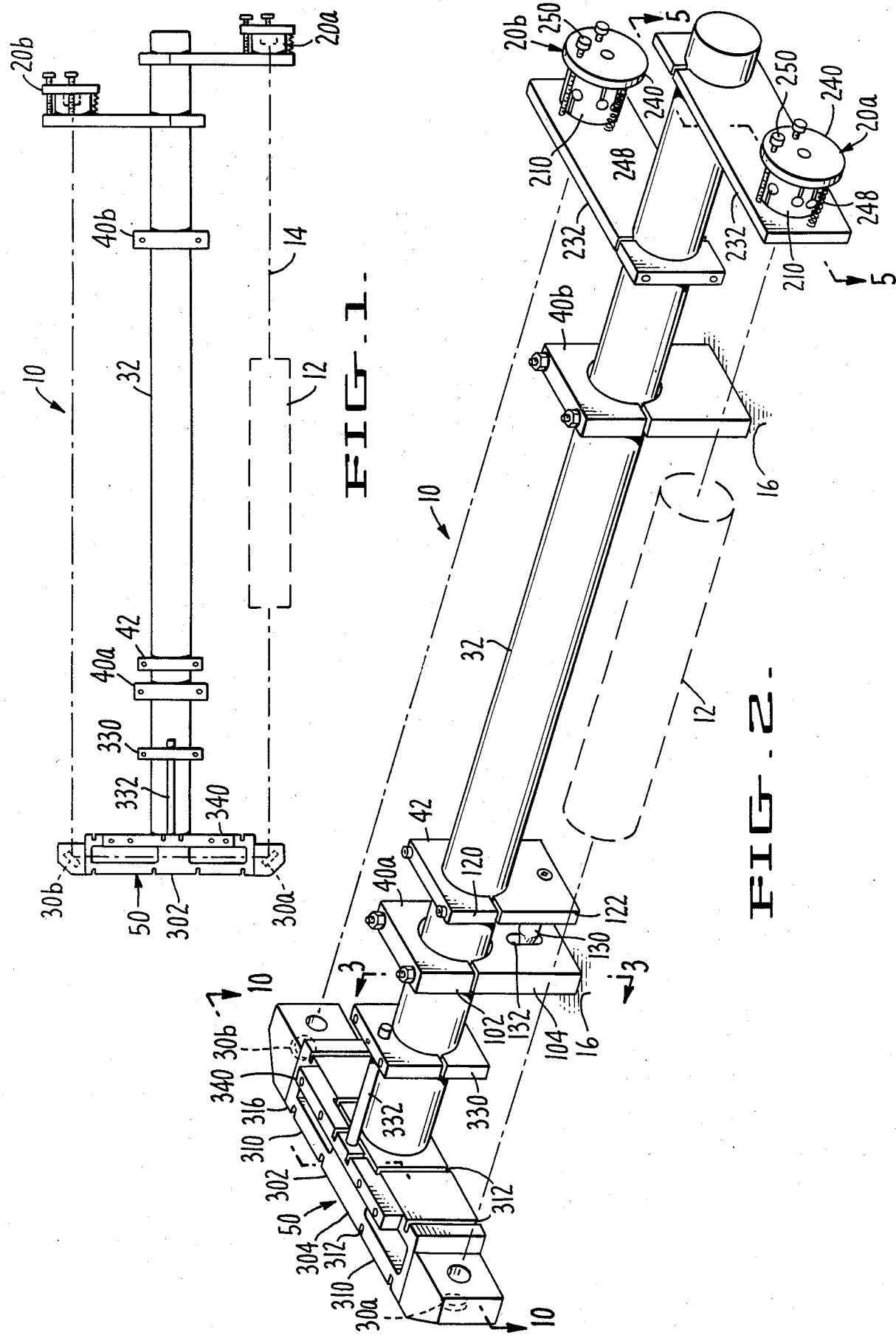

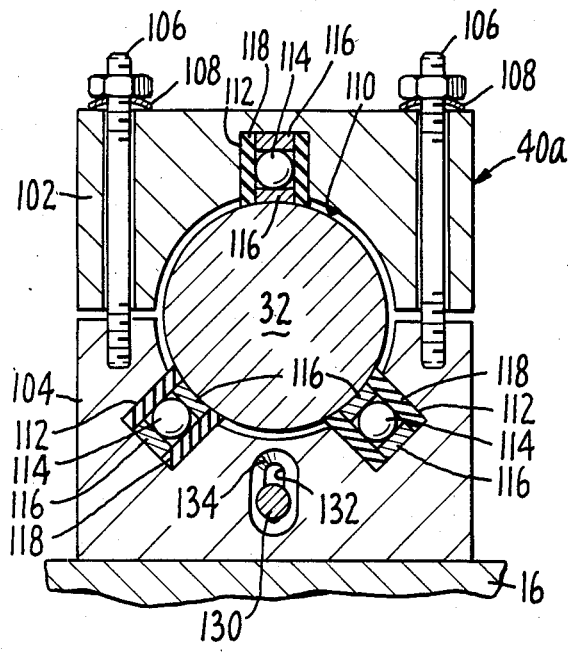
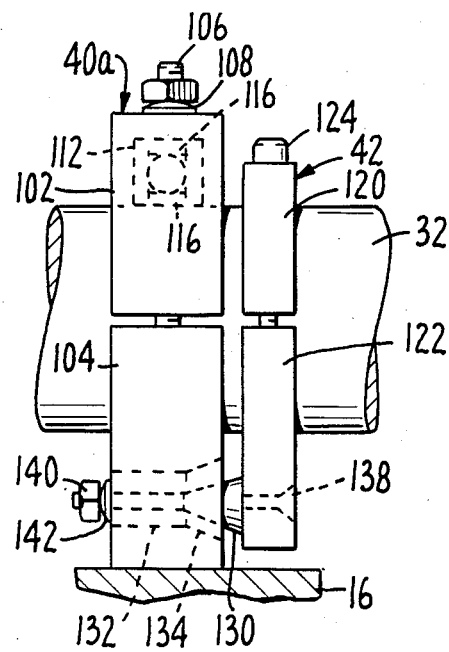
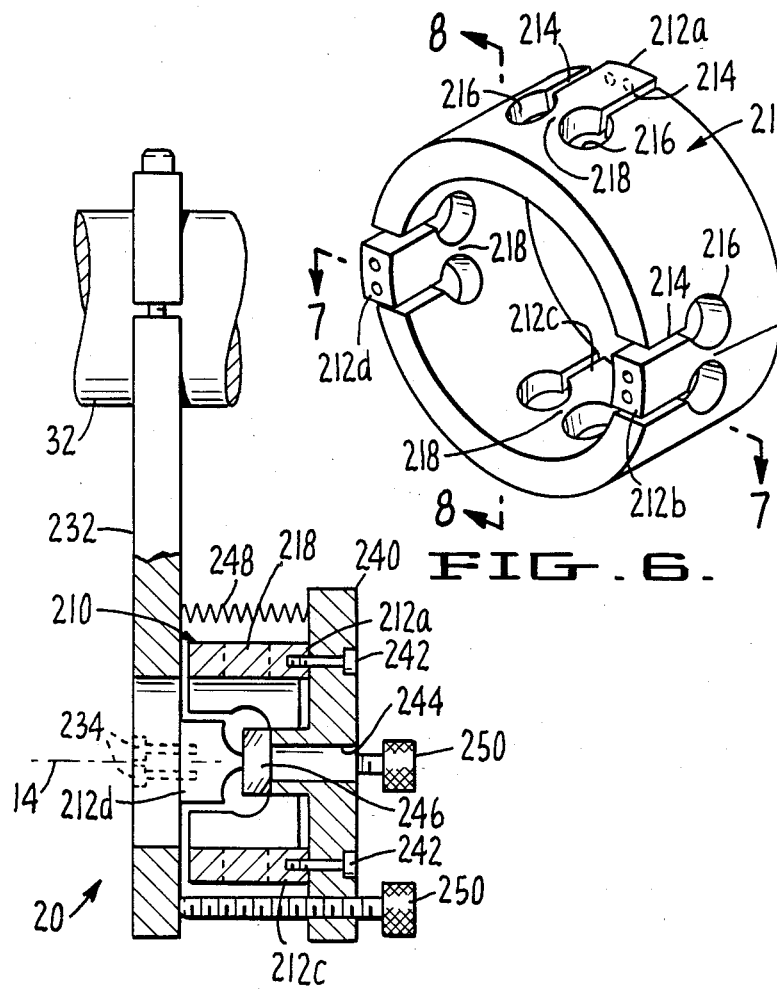
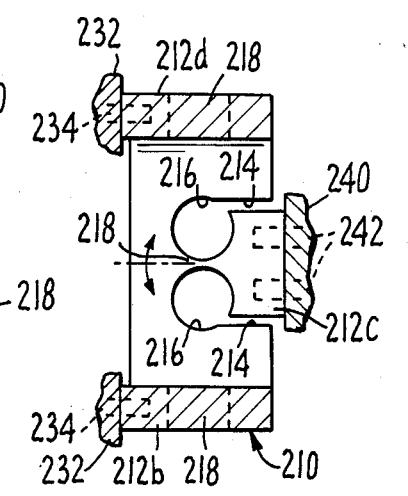
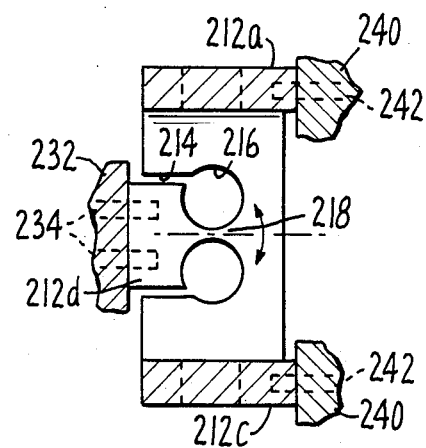

KINEMATIC RESONATOR SUPPORT

TECHNICAL FIELD

The subject invention relates to a laser system where the length stability of the resonant cavity is critical. Three mounting assemblies are disclosed for enhancing the stability of the optical path length of the laser resonator.

BACKGROUND OF THE INVENTION

The need to provide a resonate cavity of stable optical length for certain laser applications is well known. For example, stable resonator configurations have been used to enhance single frequency operation and mode-locking. In this context, a stable resonator is intended to mean that the length of the resonant cavity (measured along the laser beam between the end mirrors) is held constant.

A number of approaches have been taken in the prior art to improve the stability of the resonator. For example, it is well known that the stability of the cavity can be improved if all optical components are mounted on a bar having a relatively low thermal coefficient of expansion. One suitable material is Invar. In use, the bar is connected to the frame or laser housing through some form of kinematic mounting. A good kinematic mounting will minimize the number of contact points with the bar while removing any degrees of freedom of motion of the bar with respect to the frame. In this manner, any force placed on the frame, which could misalign the optical elements, will not be transferred to the bar. In accordance with one aspect of the subject invention, an improved kinematic mounting for an Invar bar is disclosed.

Although materials such as Invar have a relatively low coefficient of thermal expansion, the length of the Invar bar will change to some degree in response to variations in temperature. Various electromechanical servo mechanisms have been developed to compensate for gross deviations in length due to temperature. Another aspect of the subject invention is to provide a new and improved means for automatically compensating for small variations in the change in length of a support bar such that the total length of the resonant cavity can be maintained constant despite small environmental temperature changes.

The mirrors at the end of a resonant cavity are typically mounted in an adjustable support. A standard support consists of two plates which can be rotated with respect to each other about two pivot lines. The adjustments comprise a pair of screws for making this adjustment. The problem with this standard mirror mount is that as the mirror is rotated, the mirror face moves with respect to the beam path, changing the length of the resonant cavity. In the final aspect of the subject invention, an improved gimbal mirror mount is disclosed which overcomes this difficulty.

Accordingly, it is an object of the subject invention to provide a new and improved laser having enhanced stability.

It is another object of the subject invention to provide an improved kinematic mounting assembly for a laser.

It is still another object of the subject invention to provide a new and improved kinematic mounting assembly for connecting a mirror support structure or bar to a frame of a laser.

It is still a further object of the subject invention to provide improved mirror mounting assemblies.

It is still another object of the subject invention to provide improved mirror mounting assemblies which are designed to maintain the length of the resonant cavity in the laser.

It is another object of the subject invention to provide a gimbal assembly for pivotally mounting a laser mirror.

It is still a further object of the subject invention to provide a mounting assembly for a mirror which automatically compensates for changes in the length of a support bar due to temperature.

SUMMARY OF THE INVENTION

In accordance with these and many other objects, the subject invention provides for a plurality of improved support mechanisms for enhancing the stability of a laser resonator. The first improvement includes a kinematic assembly for mounting an Invar bar to a laser frame. The kinematic assembly includes a pair of brace members for receiving the bar. The brace members function to support the bar while allowing limited longitudinal and rotational movement thereof. A clamp member is securely mounted to the bar next to one of the brace members. This clamp member is then connected to the associated brace member through the interaction between a cone and an elongated slot. This interface provides the minimum number of constraints to just constrain all degrees of freedom of motion of the bar. The various mirror assemblies of the resonator can then be mounted to the bar for stable performance even if the frame of the laser is subjected to an unwanted force.

The subject invention further includes a new and improved mounting particularly suited for supporting the end mirrors of the laser cavity. The mount includes a one piece cylindrical gimbal ring having four flexure areas spaced 90° apart around the circumference thereof. The straight line between each pair of opposed flexure areas defines a pivot axis. The two pivot axes intersect at the center of the ring. One end face of the ring is mounted to a fixed member connected to the bar. A mirror plate, having a mirror holder, is connected to the other end face of the ring. In a preferred embodiment, the mirror holder locates the point on the surface on the mirror where the laser beam strikes substantially at the point of the intersection of the two pivot axes. Adjustments of the mirror plate with respect to the fixed member to align the beam will not change the length of the cavity.

In the third aspect of the subject invention, an improved assembly is disclosed for automatically compensating for changes in length of the support bar. In the preferred embodiment, the assembly is designed for mounting a pair of mirrors utilized for folding the path of the beam within the resonator. The assembly includes an elongated beam having a center section mounted to the end of the bar. The opposed ends of the beams are defined by flexure members having a parallelogram configuration. When the flexure members are rotated relative to the center section, the opposed ends will translate but remain parallel to each other and the support bar due to the deformation properties of a parallelogram. The opposed ends of the flexure members are used as mounting surfaces for the fold mirrors.

The assembly further includes a clamp connected to the bar. A biasing member is connected to the clamp. The biasing member is formed from a material having a coefficient of thermal expansion greater than the bar such that any variations in temperature will affect the length of the biasing member to a greater extent than the bar. A means is provided for connecting the biasing member to the flexure members. In the preferred embodiment, this means is defined by a lever connected to the ends of the flexure members.

In accordance with the subject invention, when a temperature variation occurs that affects the length of the bar, the simultaneous change in length of the biasing member will cause each flexure member to rotate while the opposed ends thereof, having the mirrors mounted thereon, will translate in a direction opposite to the length of change of the bar. By this arrangement, the total length of beam path will remain unchanged.

Further object and advantages of the subject invention will become apparent from the following detailed description taken in conjunction with the drawings in which:

BRIEF DESCRIPTION OF THE DRAWINGS

FIG. 1 is a top plan layout view of a laser incorporating the improved mounting assemblies of the subject invention.

FIG. 2 is a perspective layout view of the laser shown in FIG. 1.

FIG. 3 is a cross sectional view, taken along the line 3—3 in FIG. 2, of a portion of the kinematic mounting for a bar.

FIG. 4 is a side view of the kinematic assembly used for mounting the bar.

FIG. 5 is a cross sectional view, taken along the line 5—5 of FIG. 2, of the gimbal mounting for a laser mirror.

FIG. 6 is a perspective view of the one piece cylindrical gimbal ring of the subject invention.

FIG. 7 is a cross sectional view, taken along the line 7—7 in FIG. 6, of the cylindrical ring of the subject invention.

FIG. 8 is a cross sectional view, taken along the line 8—8 in FIG. 6, of the cylindrical ring of the subject

DETAILED DESCRIPTION OF THE PREFERRED EMBODIMENTS

Figure 9:
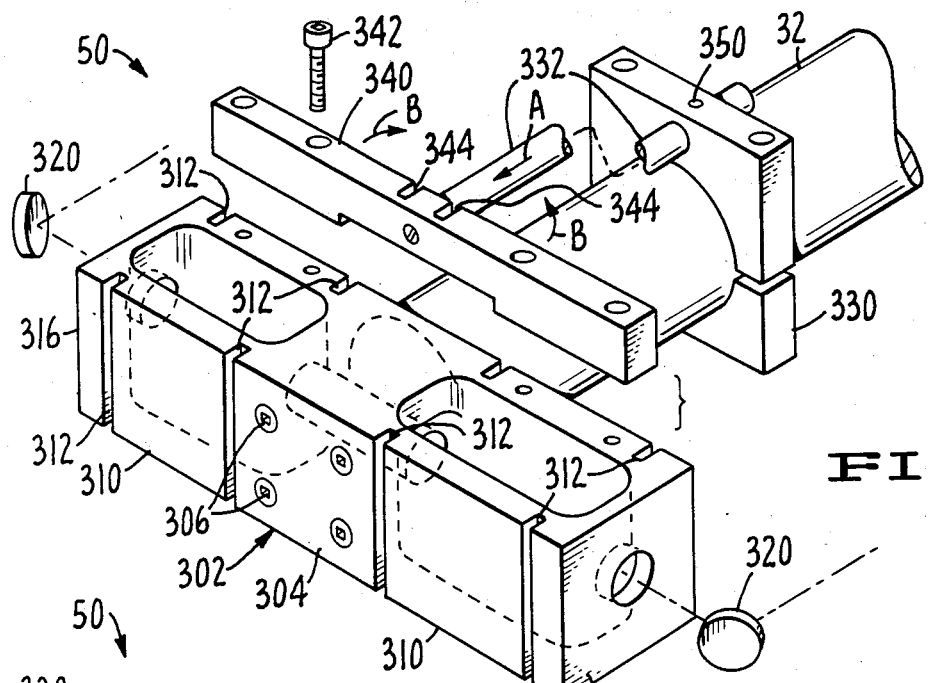
FIG. 9 is an enlarged, exploded, perspective view of the assembly for automatically compensating for the elongation of support bar due to temperature.

FIGS. 1 and 2 illustrate the various assemblies of the subject invention used in conjunction with the laser wherein the length stability of the resonant cavity is important. It is expected that each of the assemblies described herein will find use in other lasers. Their description, however, in terms of a specific laser example, is intended to aid in an understanding of the individual components.

As shown in FIGS. 1 and 2, a laser gain medium 12 is shown for amplifying light 14 passing therethrough. The gain medium assembly is typically mounted to the frame 16 of the laser device. The gain medium 12 sits within a resonant cavity, defined by two end mirrors mounted in assemblies 20A and 20B. In order to reduce the overall linear length of the resonant cavity, a pair of fold mirrors 30A and 30B are provided for reversing the direction of the beam within the cavity. The path of the beam within the cavity therefore extends from mirror 20A down to mirror 30A across to mirror 30B and back to mirror 20B. As noted above, it is desirable to make sure that the total path length of this beam remains constant for various applications.

One approach to minimize changes in the path length is to mount the various optical components on a stable bar 32 having a low coefficient of thermal expansion. In the preferred embodiment, the bar is formed from Invar. The Invar bar is mounted to the frame 16. In accordance with the subject invention, the bar 32 is mounted to the frame using an improved kinematic assembly. As will be described in greater detail below, the kinematic assembly includes a pair of brace members 40A and 40B and a clamp member 42. The mirror mounts 20A and 20B at the ends of the resonant cavity are typically provided with the ability to adjust the angles of the mirrors to align the laser beam within the cavity. As will be described below, the mounting assemblies 20A and 20B are specially designed to allow adjustment of the angle of the mirrors without altering the length of the cavity.

In the third aspect of the subject invention, the fold mirrors 30A and 30B are mounted on an assembly 50 which is designed to automatically compensate for changes in length of the bar 32. While the low thermal coefficient of the expansion of the Invar bar eliminates gross changes in the size of the resonant cavity, even small changes can affect the performance of certain lasers. The assembly 50 is designed to automatically compensate for these small changes.

Turning now to FIGS. 3 and 4, the kinematic mounting for the Invar bar will be discussed in greater detail. The mounting assembly includes a pair of brace members 40A and 40B mounted to the frame 16. The brace members are intended to act as a gravitational support for the Invar bar 32. The configuration of the brace members must allow for limited movement of the bar both rotationally and longitudinally. In the preferred embodiment of the subject invention, each brace member 40 includes upper and lower sections 102 and 104. These sections are affixed together by a pair of screws 106 which are spring-loaded by washers 108. The screws pass through the upper member 102 and are threaded into the lower member 104. By this arrangement, a certain amount of spring tension can be placed on the bar.

In the illustrated embodiment, each brace member 40 is provided with an circular opening 110 for receiving the circular bar 32. The circular opening 110 is provided with a bearing means. More specifically, at three points spaced about the opening 110, a cubical recess 112 is provided into which ball bearings 114 are received. A pair of hardened tungsten carbide disks 116 are mounted on either side of the ball bearing. The ball bearing 114 and pads 116 are fitted within a foam cylinder 118. This bearing arrangement provides a low wear, low friction interface between the bar 32 and the brace member 40. As illustrated in FIG. 2, the two brace members are spaced apart on the frame by an amount approximately sixty percent of the length of the bar.

The kinematic support further includes a clamp 42 which is securely mounted to the bar 32, adjacent one of the brace members 40A. In the illustrated embodiment, clamp 42 is made up of upper and lower portions 120 and 122 connected by a pair of screws 124. These screws are tightened to securely attach the clamp to the bar.

Clamp 42 is connected to the brace member 40A. This connection must be of the type which will only constrain the remaining degrees of freedom of motion allowed by the brace members alone. No additional constraints may be added by this connection. A variety of mechanical means could be used to achieve this result and limit the remaining longitudinal and rotational movement of the bar. In the preferred embodiment, the connection means is defined by the engagement of a conical nose and a chamfered slot.

As shown in FIG. 4, the conical nose 130 is formed on the clamp 42 and is received in slot 132 formed in the brace 40A. The sides of slot 132 are chamfered at 134. The elongated slot extends vertically in the brace 40A which is along the radius of the circular cross section of the Invar bar. In the preferred embodiment, the head of the nose 130 is drawn into the slot by a screw 138. As illustrated in FIG. 4, the screw 138, which is countersunk in the clamp 42, passes through the nose to the other side of the brace. The end of the screw is affixed by a nut 140 about a spring washer 142.

The kinematic mounting assembly described herein removes all degrees of freedom of motion of the bar with the minimum number of constraints. In this manner, any force which is generated in the frame 16 by outside forces will not be transmitted to the bar.

Turning now to FIGS. 5 through 8, there is illustrated the first of two improved mirror mounting assemblies of the subject disclosure. The mirror mount 20 includes a unique, one-piece cylindrical gimbal pivot ring 210, shown best in FIG. 6. The use of this simple pivot ring provides a low cost and effective mounting system for maintaining the length of the resonant cavity of the laser while allowing the angle of the mirror to be adjusted.

The cylindrical ring 210 is provided with four mounting arms 212A-D, located about the circumference of the ring at 90° intervals. One pair of opposed mounting arms 212A and 212C, project towards one end face of the ring while the remaining two arms project towards the other end of the ring. Each arm is defined by a pair of slots 214 machined into the ring. Each slot 214 terminates in a hole 216. The material of the arm between the pairs of holes 216 defines an area of flexure 218 about which the ring can pivot. The flexure areas 218 are all arranged to be in a common radial plane. The straight line between each pair of opposed flexure areas defines a pivot axis. The intersection of these two axes lies in the center of the ring and defines the pivot point of the ring.

As illustrated in FIG. 5, one pair of arms 212 are mounted to a fixed plate 232 which is in turn connected to the Invar bar 32. The connection is made through a pair of screws 234 passing through the fixed plate and into the ends of the mounting arms. The remaining set of mounting arms are used to affix a mirror plate 240 via screws 242. Mirror plate 240 includes a mirror support 244 projecting within the interior of the ring 210. The end of mirror support is used to mount a mirror 246. In the preferred embodiment, the face of mirror 246 is located substantially in the radial plane defined by the flexure areas 218. This position, however, is not essential, particularly if one insures that the path of the incoming beam crosses the pivot point of the ring.

In accordance with the subject invention, the mirror plate 240 is adjustable with respect to the fixed plate 232. As illustrated in FIG. 5, one or more springs 248 are mounted between the mirror plate 240 and the fixed member 232. In addition, a plurality of adjustment screws 250 are provided for pivoting the plate. Screws 250 are threaded through openings in the plate and abut the fixed member 232. As the screws are rotated, the plate will tend to rotate with respect to the fixed member 232 about the pivot point defined by the flexure regions 218 in the gimbal ring 210. In use, the angle of the mirror can be adjusted to align the laser beam without altering the length of the cavity.

Figures 10, 11:
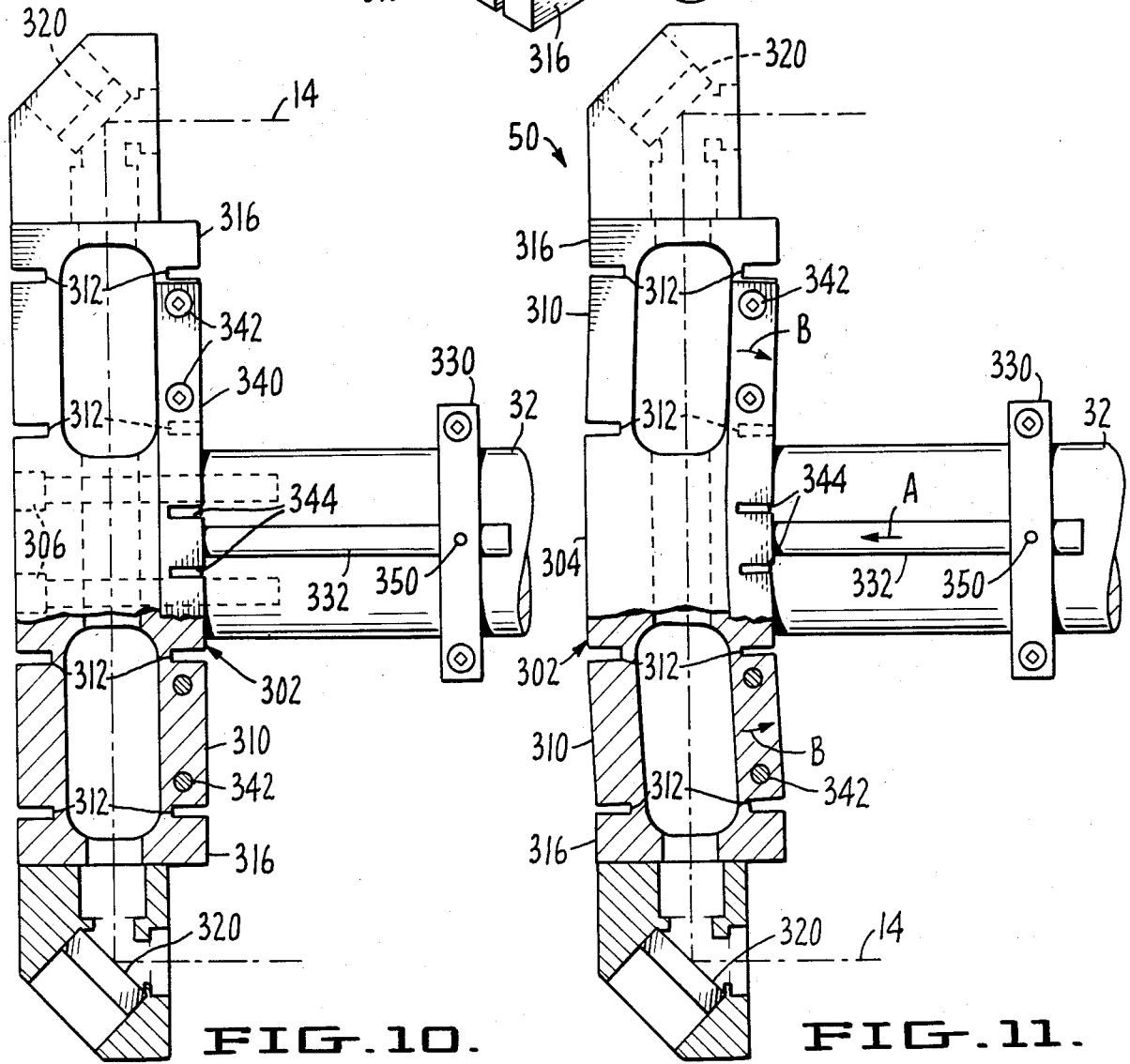
FIG. 10 is a top plan view, partially in section, taken along the line 10—10 in FIG. 2 of the assembly shown in FIG. 9.
FIG. 11 is a view similar to FIG. 10, showing the expansion of the biasing member which in turn causes the flexure of the beam thereby maintaining the total path length of the laser beam.

Turning now to FIGS. 9-11, the third aspect of the subject invention will be discussed. More specifically, a mounting assembly 50 is disclosed for compensating for changes in length in the bar 32 due to temperature. The assembly 50 includes an elongated beam 302 having a center section 304 which is connected by four screws 306 to one end of the Invar bar 32. The beam 302 further includes a pair of opposed flexure members 310 hingedly connected thereto. Each of the flexure members can be thought of as having a parallelogram configuration. The configuration of each flexure member is analogous to a four bar linkage. This configuration is achieved by providing a plurality of slots or hinges 312 in the beam. The slots are arranged such that opposed side pieces of the member are of the same length. As long as the latter criteria is met, when the flexure members are rotated with respect to the center section 304, the end pieces 316 will remain parallel to each other and to the support bar. The parallel relationship is necessary to insure that the angle of the beam is not changed. A pair of mirrors 320 are mounted to the ends 316 of the flexure members 310.

Assembly 50 further includes a clamp 330 mounted to the Invar bar 32, spaced from beam 302. A biasing member 332 is connected to the clamp 330. Biasing member is formed from a material that has a coefficient of thermal expansion greater than that of the Invar bar. Accordingly, any variations in temperature will affect the length of the biasing member to a greater extent than the Invar bar. The expansion of the biasing member is coupled to the flexure members 310 via a lever 340. Lever 340 is defined by an elongated bar, the opposed ends of which are connected to the flexure members 310 via screws 342. The center of lever 340 is not connected to the center section 304 of beam 302. Lever 340 includes a pair of slots 344 which define hinges about which the lever can flex.

In use, the position of the fixed members 232 (FIG. 2) carrying the end mirror assemblies 20 are adjusted to set the desired length of the cavity. Any temperature variations which occur thereafter will effect the length of the Invar bar. Without the present mechanism, this temperature variation will cause mirrors 320 to be moved either closer to or farther from the end mirrors thereby changing the length of the cavity. The subject invention automatically compensates for this change in length of the bar.

This result is illustrated in FIG. 11. More particularly, a temperature variation which would cause the bar to expand will cause the biasing member to expand even more. This expansion will place a force on the lever 340 in the direction of arrow A. The force on the lever will cause the flexure members to rotate in the directions shown by arrows B in FIG. 11. Because of the four bar or parallelogram configuration of the flexure members 310, the ends 316 thereof will move in a direction opposite to arrow A while remaining parallel to each other and their original orientation. The direction of movement of the ends will be in a direction opposite to direction of expansion of the end of the Invar bar. The extent of the movement of the flexure members can be controlled by the location at which the biasing member 332 is connected to the clamp 330. This adjustment can be made through a set screw 350.

Although not illustrated in FIG. 11, the assembly 50 will react and work when the ambient temperature is reduced. In this case, biasing member 332 will contract, pulling on lever 340 and causing the flexure members to rotate in the opposite direction of that shown in FIG. 11. While the illustrated embodiment shows a pair of flexure members 310, the subject concept could be implemented with a single flexure member. For example, one of the two mirrors 320 could define the end of a resonant cavity and actually include a mirror mount similar to those described above at 20A. It is intended that the scope of the subject invention includes an assembly with a single flexure member.

While the subject invention has been described with reference to the preferred embodiments, other variations could be made, by once skilled in the art, without varying from the scope and spirit of the subject as defined by the appended claims.

I claim:

1. An assembly for adjustably mounting a mirror to a fixed member comprising:
   a pivot member having a central opening and two opposed end faces, said pivot member further including four mounting arms formed therein and spaced apart by about 90 degrees, with one pair of opposed mounting arms projecting towards one of the two end faces and with the other pair of opposed mounting arms projecting towards the other end face and with each arm having a region of reduced width capable of flexure, and with all of said flexure regions lying substantially in one radial plane intermediate the opposed end faces of said pivot member, and with one pair of said mounting arms being connected to said fixed member;
   a mirror plate connected to the remaining pair of mounting arms of said pivot member, said mirror plate including mirror holder for mounting a mirror thereon; and
   means for adjusting the mirror plate with respect to the fixed member about said flexure regions of said mounting arms.

2. An assembly as recited in claim 1 wherein said pivot member is a cylindrical ring.

3. An assembly as recited in claim 1 wherein said means for adjusting the mirror plate includes a plurality of screws threaded though said mirror plate and abutting said fixed member.

4. An assembly as recited in claim 1 wherein said mirror holder projects within the interior of said pivot member.

5. An assembly as recited in claim 1 wherein said mirror holder projects within the interior of said pivot member in a manner such that the mirror will lie substantially in said radial plane defined by said flexure regions of said mounting arms.

* * * * *